United States Patent [19]

Bridge, Jr. et al.

[11] Patent Number: 5,890,167
[45] Date of Patent: *Mar. 30, 1999

[54] PLUGGABLE TABLESPACES FOR DATABASE SYSTEMS

[75] Inventors: William H. Bridge, Jr., Alameda; Jonathan D. Klein, Pleasanton; J. William Lee, Foster City; Juan R. Loaiza, San Carlos; Alex Tsukerman, Foster City; GianFranco Putzolu, San Francisco, all of Calif.

[73] Assignee: Oracle Corporation, Redwood Shores, Calif.

[ * ] Notice: The term of this patent shall not extend beyond the expiration date of Pat. No. 5,873,102.

[21] Appl. No.: 852,968

[22] Filed: May 8, 1997

[51] Int. Cl.$^6$ .................................................. G06F 17/30
[52] U.S. Cl. ..................... 707/204; 707/101; 707/202; 707/203
[58] Field of Search ................... 707/204, 1–4, 707/100, 101, 202, 203

[56] References Cited

U.S. PATENT DOCUMENTS

| | | | |
|---|---|---|---|
| 5,222,235 | 6/1993 | Hintz et al. | 707/101 |
| 5,396,623 | 3/1995 | Hintz et al. | 707/101 |
| 5,579,516 | 11/1996 | Van Maren et al. | 707/1 |

*Primary Examiner*—Thomas G. Black
*Assistant Examiner*—Hosain T. Alam
*Attorney, Agent, or Firm*—McDermott, Will & Emery

[57] ABSTRACT

A pluggable tablespace is enabled by logically partitioning a database into a set of tablespaces and storing all of the tablespaces disk pointers in tablespace-relative format. A pluggable set of tablespaces is unplugged by exporting the associated metadata, and making a binary copy of the tablespaces. The pluggable set of tablespaces is plugged into a target database by making the pluggable set accessible to the target database and importing the associated metadata, without patching any of the disk pointers.

24 Claims, 13 Drawing Sheets

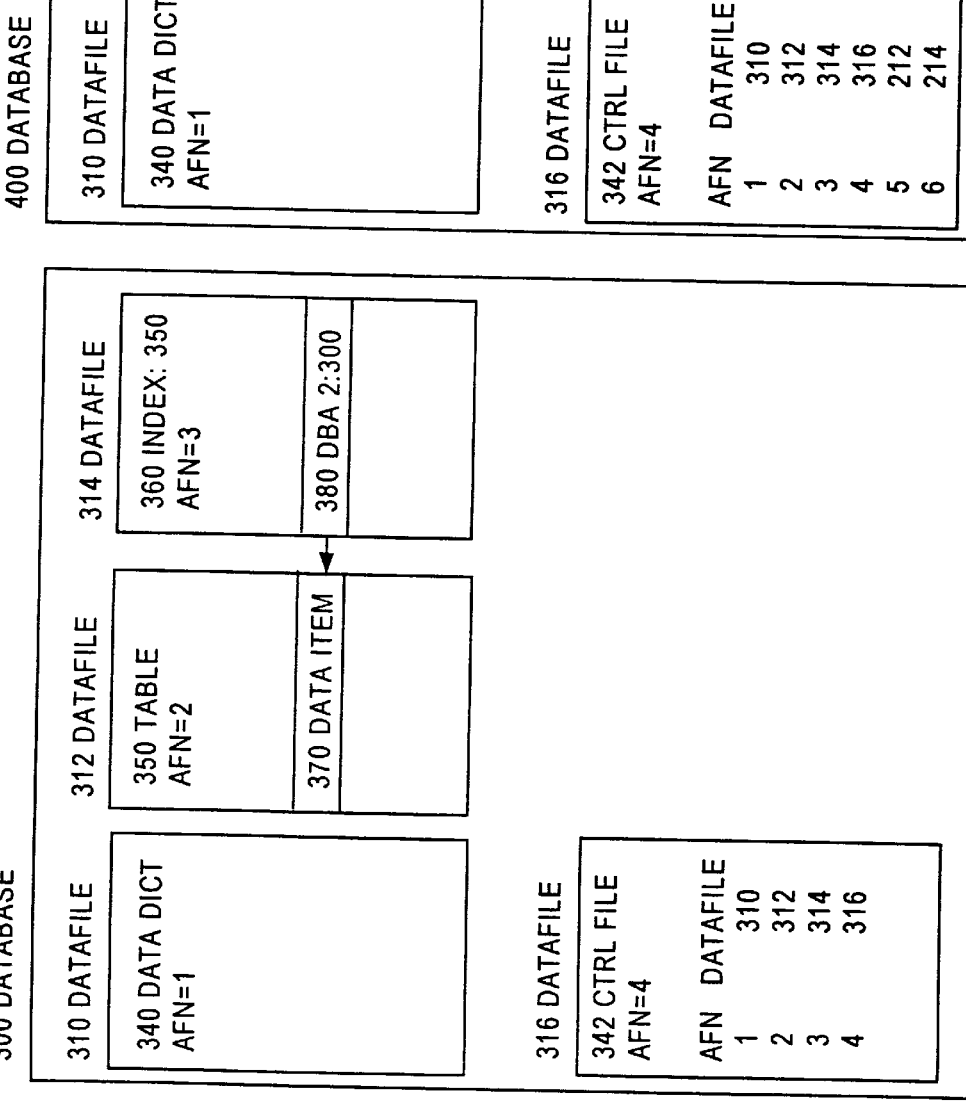
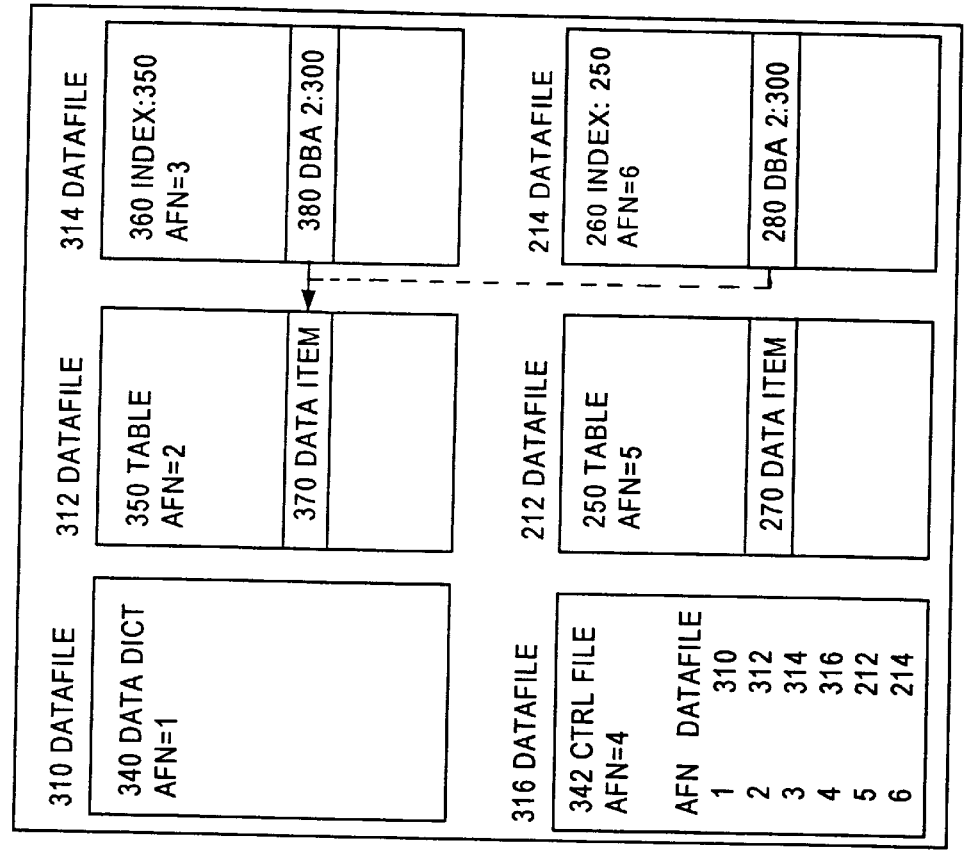

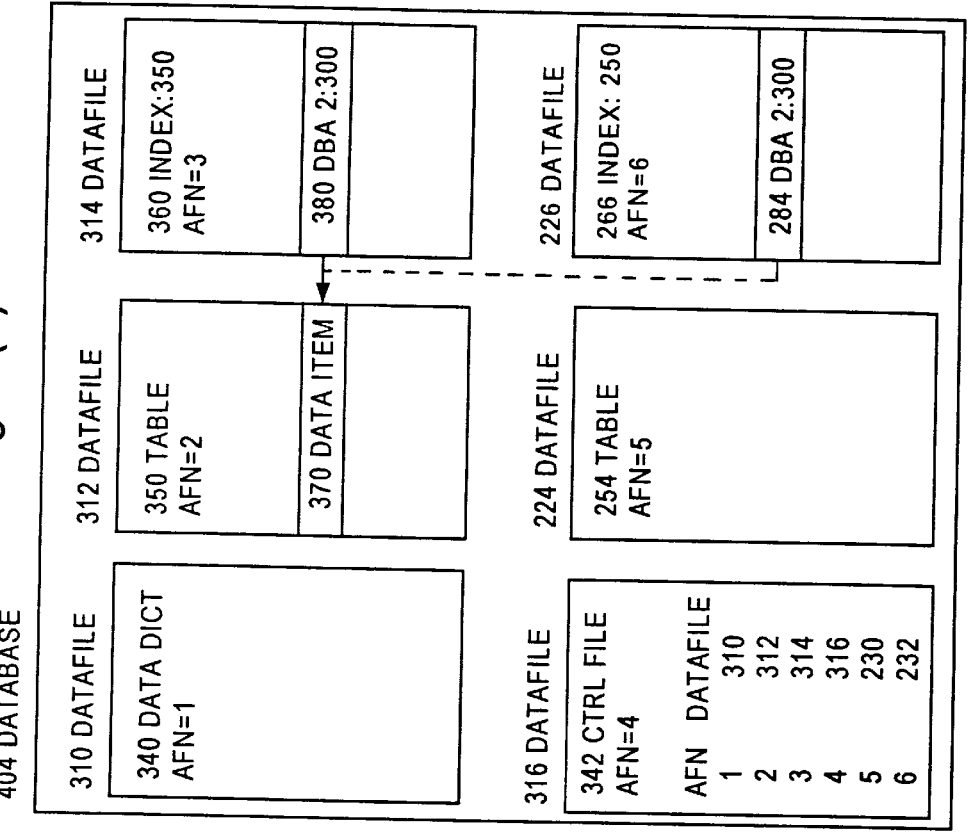
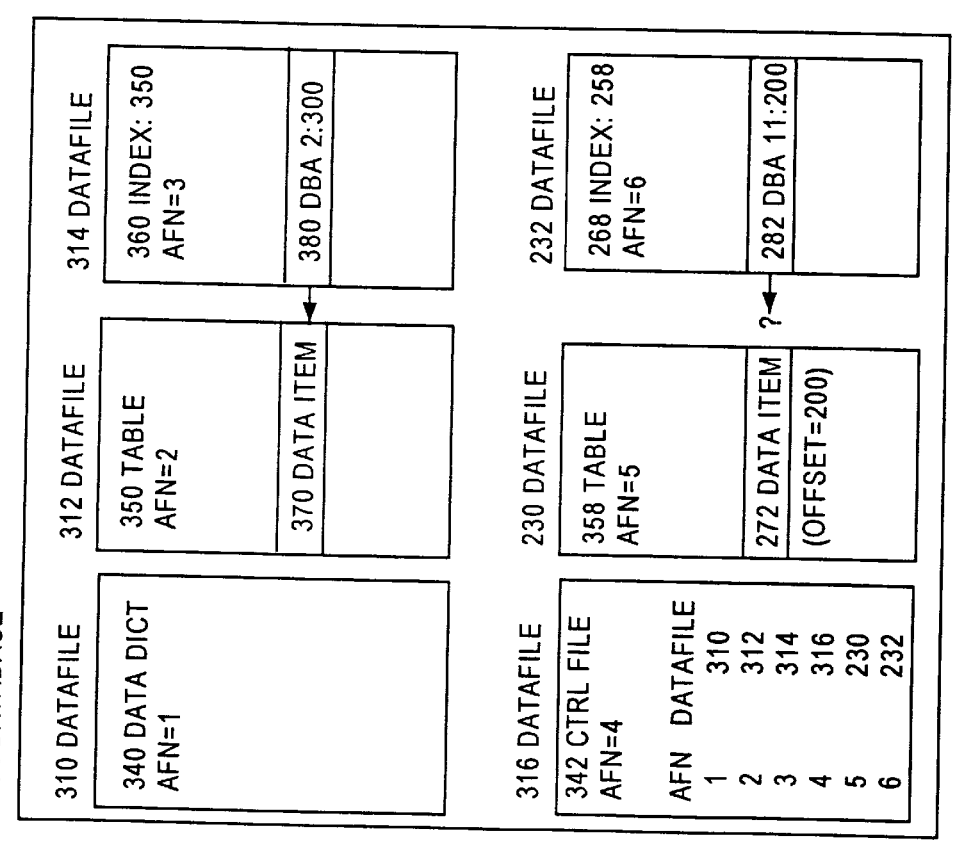

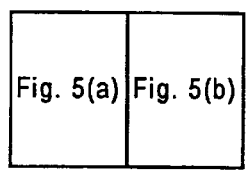
Fig. 5
Fig. 5(a)
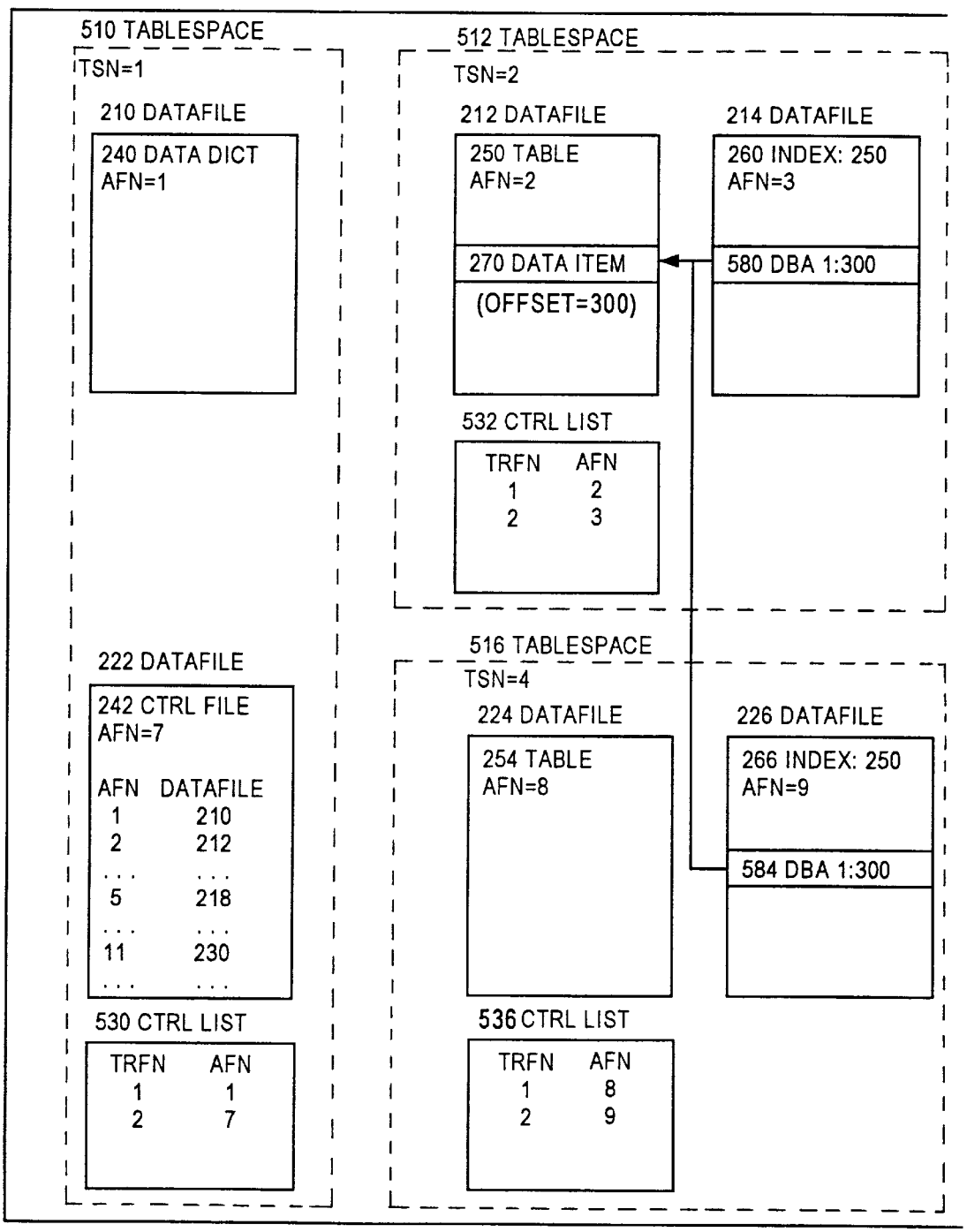

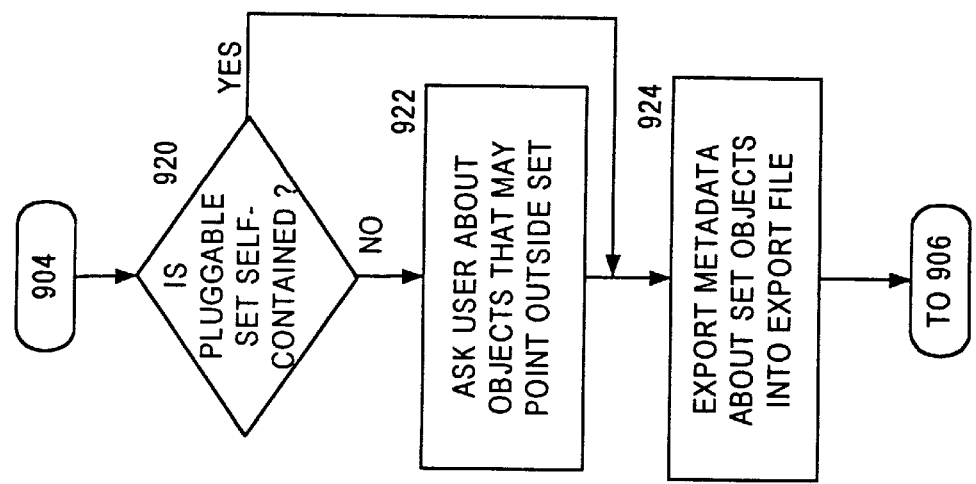
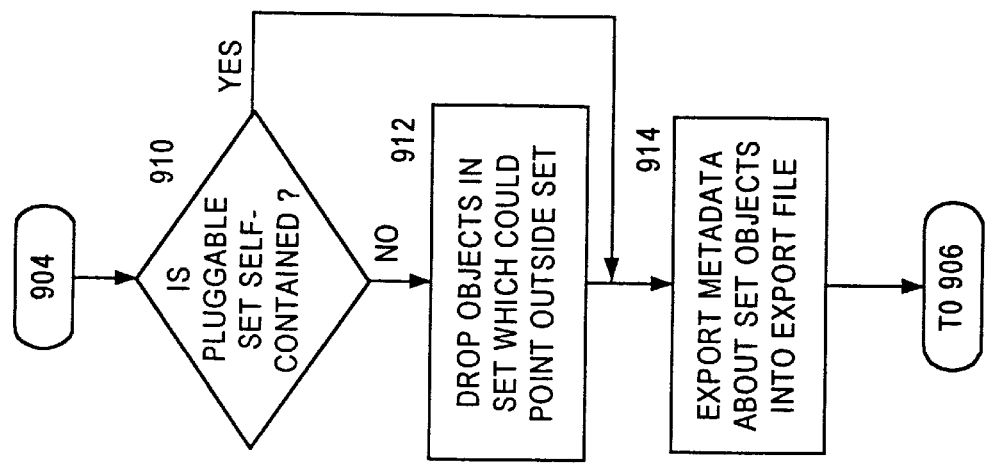
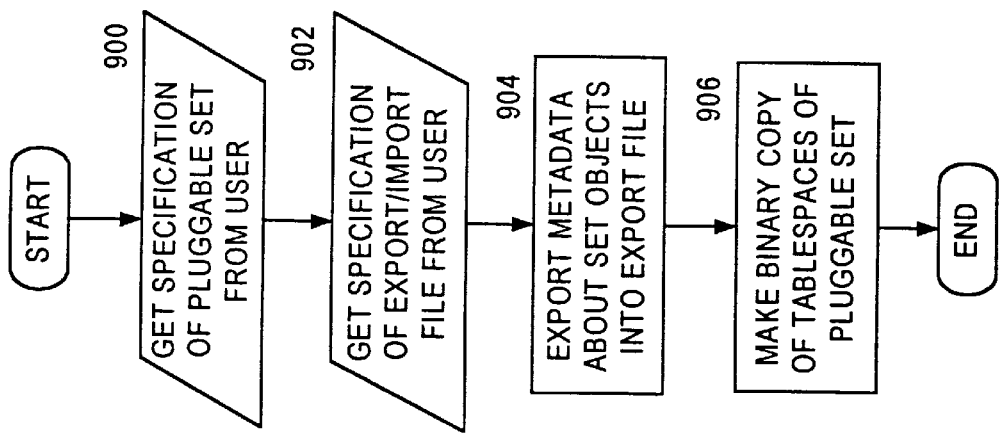

PLUGGABLE TABLESPACES FOR DATABASE SYSTEMS

RELATED APPLICATIONS

The present application is related to the following applications:

U.S. patent application Ser. No. 08/865,693, entitled "Tablespace-Relative Database Pointers," filed by William H. Bridge, Jr., Jonathan D. Klein, J. William Lee, Juan R. Loaiza, Alex Tsukerman, Gianfranco Putzolu on May 30, 1997 (attorney docket No. 3018-063); and U.S. patent application Ser. No. 08/846,511, entitled "Pluggable Tablespaces on a Transportable Medium," filed by William H. Bridge, Jr., Jonathan D. Klein, J. William Lee, Juan R. Loaiza, Alex Tsukerman, Gianfranco Putzolu on Apr. 29, 1997.

FIELD OF THE INVENTION

The present invention relates to computer systems and more particularly to copying a subset of one computer database to another.

BACKGROUND OF THE INVENTION

Today, much information is digitized, stored on disk, and accessed by database. These databases include on-line transaction processing (OLTP) databases and data warehouses. OLTP databases are used for handling transactions, such as bank transactions for deposits. Data warehouses are used for decision support, such as analyzing market trends in retail stores. Data warehouses can be huge, more than a few million megabytes. For example, a huge data warehouse can store all of a company's financial transactions and employment records so that an analyst can use the data warehouse to answer potentially any question about the company.

On the other hand, a data warehouse can be a small "data mart," holding just enough information for answering questions in a specific area. A salesperson, for example, may use a data mart stored on a lap top computer in making sales. The salesperson's data mart in this example would contain information, copied from a larger data warehouse, about that sales person's customers.

When building data warehouses and data marts, there is often a need to transfer a large amount of data between databases. For example, a data warehouse storing information about a company's finances periodically needs data from an OLTP database. When "feeding" data from an OLTP database into a data warehouse, the data is usually first moved from the OLTP database into a temporary database and cleaned up. One kind of clean up operation is to transform all dates into a common format. As another example, it is desirable to build departmental data warehouses and integrate them later into a corporate data warehouse. In yet another example, it is desirable to transfer information from a data warehouse to a data mart on a lap top computer or onto a CD-ROM. Moving data between databases is useful for other purposes as well.

Copying an entire database is reasonably fast by using standard operating system utilities to make an exact, "binary" copy of all the files in the database. However, making an exact copy of a database is not so useful for building data warehouses, because OLTP databases and data warehouses are typically not identical. As a result, database owners prefer to incorporate new information into their existing databases, letting that information become a subset of the existing database, not a separate database.

Moving subsets of data between databases is a slow process. One cannot simply copy a subset of files in one database into another database and expect all the data to be integrated into the other database automatically because of the internal structure of databases. Specifically, two aspects of the internal structure of a database create difficulties: absolute database pointers in datafiles and metadata information in the database dictionary.

Some databases, such as relational databases, store their information in indexed tables. Thus, a relational database contains two fundamental kinds of objects: tables, which contain the user data, and non-table objects. A non-table object can be an index, which contains database pointers to the table upon which the index was built.

An object is stored in a single operating system file, called a datafile. When a datafile is added to a database, it is assigned an "absolute file number" which is unique throughout the entire database. The absolute file number of a datafile is an index of the corresponding entry in a control file, which contains operating system specific information about that datafile, such as the operating system file name.

A table object, which houses user data, is divided into one or more data blocks, containing one or more records (called "rows". Rows contain one or more columns, which contain the specific information, such as a customer's name or automobile part number, the user stores. Since every data block belongs to some datafile, it is natural to identify each block by the absolute file number to which the data block belongs and by the file offset of the data block. The absolute file number provides an easy way to locate the operating system specific information necessary to open the datafile, and it is efficient to access a data block within an opened datafile by the file offset.

As a result, the combination of the absolute file number and the file offset as an absolute data block address ("absolute DBA") is a natural way to make a reference to any particular data block within the database system. An "absolute disk pointer" is a data structure that stores an absolute DBA as a pointer to a data block. Thus, an absolute disk pointer comprises an absolute file number and a file offset.

With reference to FIG. 2, database 200 contains ten objects: data dictionary 240; control file 242; five tables of user data, 250 to 258; and five index files, 260, to 268, built upon tables 250 to 258, respectively. Each object is stored a datafile, 210 to 232, and assigned a unique absolute file number (AFN) of 1 to 12, respectively. Data item 270 is found in table 250, stored at offset 300 in datafile 212 having an AFN of 2. Index file 260 built on table 250 contains an absolute disk pointer 280 pointing to data item 270 with an absolute DBA of 2:300. Given a disk pointer with an absolute DBA of 2:300, the corresponding data item is fetched by looking up the AFN in control file 242 to find the name of datafile 212 and other operating system specific information. With that information, datafile 212 is opened, and the block at offset 300 is retrieved. Similarly, absolute disk pointer 282 in index 268 has an absolute DBA of 11:200, pointing to data item 272 in table 258.

Two indexes may be built on the same table. For example, index 266 is also built on table 250 and includes disk pointer 284 pointing to data item 270. Disk pointer 280 and disk pointer 284 contain the same absolute DBA of 2:300 and consequently point to the same data item, data item 270.

A drawback to the use of absolute disk pointers is that it complicates the transfer of a group of datafiles between two databases. Every absolute file number within a database is unique, but absolute file numbers are not unique between two different computer databases. Thus, an absolute disk pointer in one computer database may contain the same absolute file number as an absolute disk pointer in another database, but the datafiles referenced by the two absolute disk pointers are completely different. As a result, the copied disk pointer must be fixed (or "patched") to point to the correct location.

For example, with reference to FIG. 2, database 200 is a database containing absolute disk pointer 270 having an AFN of 2, which according to control file 242 of database 200 is datafile 212. However, an AFN of 2 in database 300, shown in FIG. 3, is also in use, in absolute disk pointer 380, pointing to datafile 312. Therefore, the meaning of absolute DBA 2:300 is different in database 300 than in database 200. If table 250 and index file 260 are copied from database 200 to database 300, to produce database 400 shown in FIG. 4(a), then unchanged absolute disk pointer 280 incorrectly points to data item 370 instead of data item 270. Datafile 212 is assigned a new AFN, in order to be unique, since 2 was already in use for datafile 312. Consequently, absolute disk pointer 280 must be patched to be 5:200 to properly point to data item 270, or absolute disk pointer 280 would be aliased to the wrong data item.

Another reason why absolute disk pointers need patching is that it is possible for a copied absolute disk pointer to be invalid in the destination database. For example, copying datafiles 230 and 232 from database 200 to database 300 results in database 402 of FIG. 4(b). Absolute disk pointer 282 has an AFN of 11, but there is no datafile with that AFN in control file 342. Therefore, copied absolute disk pointer 282 is invalid in database 402. In this time, absolute disk pointer 282 must be modified to have an AFN of 5.

Since it is typical to have a very large number of absolute disk pointers within a datafile, it is problematic to use binary copies of datafiles within another database. Within the transferred datafile, every absolute disk pointer must be patched to avoid re-using an active absolute file number in the other database. Patching absolute disk pointers involves inspecting every part of every datafile for disk pointers and fixing each disk pointer. For large databases, this procedure becomes very time-consuming and may even be impossible if a database cannot recognize or enumerate all the disk pointers in datafiles. Thus, it is desirable to avoid absolute disk pointer patching when transferring a group of datafiles between databases.

Another issue that complicates the transfer of a subset of a database is the problem of integrating the metadata from a source database for that subset to a target database. Metadata is information about data in a database, such as data dictionary information about what tables are in the database, what columns a table has, what indexes have been built for a table, and so forth. Metadata describes objects in the database, and these objects may contain disk pointers.

A subset of a database may be self-contained; i.e. all the objects in the subset refer to only other objects in the same subset. For example, indexes in a self-contained subset point only to tables in the same subset. Thus, in the first example, datafiles 212 and 214 constitute a self-contained subset of database 200 because index 260 in datafile 214 was built upon table 250 in datafile 212. When a subset is self-contained, the metadata can be reconstructed without pointing to non-existent data.

On the other hand, if a database subset is not self-contained, there are "dangling" disk pointers in the transferred database objects. For example, there may be an index in the subset pointing to a table outside of the subset. Referring to FIG. 4(c), database 404 is the result of copying a database subset consisting of datafiles 224 and 226 from database 200 into database 300. Since index 266 in datafile 226 is an index file built on a table outside the subset, namely table 250 in datafile 212, index 266 contains dangling disk pointers. Naively reconstructing metadata for the objects of a non-self-contained subset and enabling all indexes in the subset will lead to having objects that point to non-existent data.

As a result, the conventional solution is to avoid patching absolute disk pointers and integrating metadata by exporting tables in their entirety into a high-level, data description language (DDL) format that does not employ pointers or separate metadata at all. In exporting a table, the database system generates a series of high-level statements that describe how to recreate the entire table and the associated metadata in the destination database.

When the exported data is imported by a destination database, the tables and metadata are reconstituted by executing the exported DDL statements through a high-level interface, such as a SQL layer. Export and import are two common, operations nearly universally supported. While importing and exporting groups of tables are functional, they are very slow. For example, importing a gigabyte (a thousand megabytes) of exported data can take a few days to complete. Therefore, there is a need for a means to rapidly transfer data between databases.

Export and import procedures also make publishing data for databases on CD-ROM less useful. If a CD-ROM is manufactured with a group of exported tables, the data stored on the CD-ROM must be imported into the target database in a time consuming operation. Moreover, the import procedure makes a copy of the information, reducing the limited amount of persistent memory storage, such as hard disk space. It is desirable to be able to use the data on a CD-ROM directly without having to import it.

SUMMARY OF THE INVENTION

One aspect of the invention is a method for unplugging a tablespace, which is associated with metadata and contains disk pointers. All the disk pointers are stored in tablespace-relative format, indicating a location of a corresponding data item relative to the tablespace containing the disk pointer. During the unplugging procedure, the metadata associated with the datafile is saved and a binary copy of the tablespace and the saved metadata is made to a memory.

Another aspect of the invention is a method for plugging in an unplugged tablespace by making the unplugged tablespace available to a target database, incorporating metadata for the unplugged tablespace, and locating a data item associated with any one of the disk pointers included in the tablespace without patching the disk pointers.

In still another aspect of the invention, a method for transferring a tablespace from a first database to a second database includes the step of storing disk pointers contained by the tablespace in tablespace-relative format. The tablespace is unplugged from the first database by saving metadata associated with the tablespace and by making a binary copy of the tablespace and the saved metadata. The tablespace is plugged into the second database by making the binary copy accessible to a computer system of the second database, incorporating the saved metadata, and locating a data item associated with any one of the disk pointers without patching the disk pointer.

In yet another aspect of the invention, a computer readable medium stores sequences of instructions for storing disk pointers as tablespace-relative pointers, for saving metadata associated with a tablespace, and for making a binary copy of the tablespace and the exported metadata. In another aspect, a computer readable medium stores instructions for making an unplugged tablespace available to a target database, incorporating metadata associated with the tablespace, and locating a data item associated with any one of the disk pointers without patching the disk pointer.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a depiction of a conventional destination database.

FIGS. 4(a), 4(b) and 4(c) are a depiction of copying a conventional database subset.

FIG. 5, which is subdivided into FIGS. 5(a) and 5(b), is a depiction of a source database according to an embodiment of the present invention.

FIGS. 9(a), 9(b), and 9(c) are flowcharts illustrating the operation of unplugging a set of tablespaces from a database according to embodiments of the present invention.

DESCRIPTION OF THE PREFERRED EMBODIMENT

A method and apparatus for moving information between databases are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
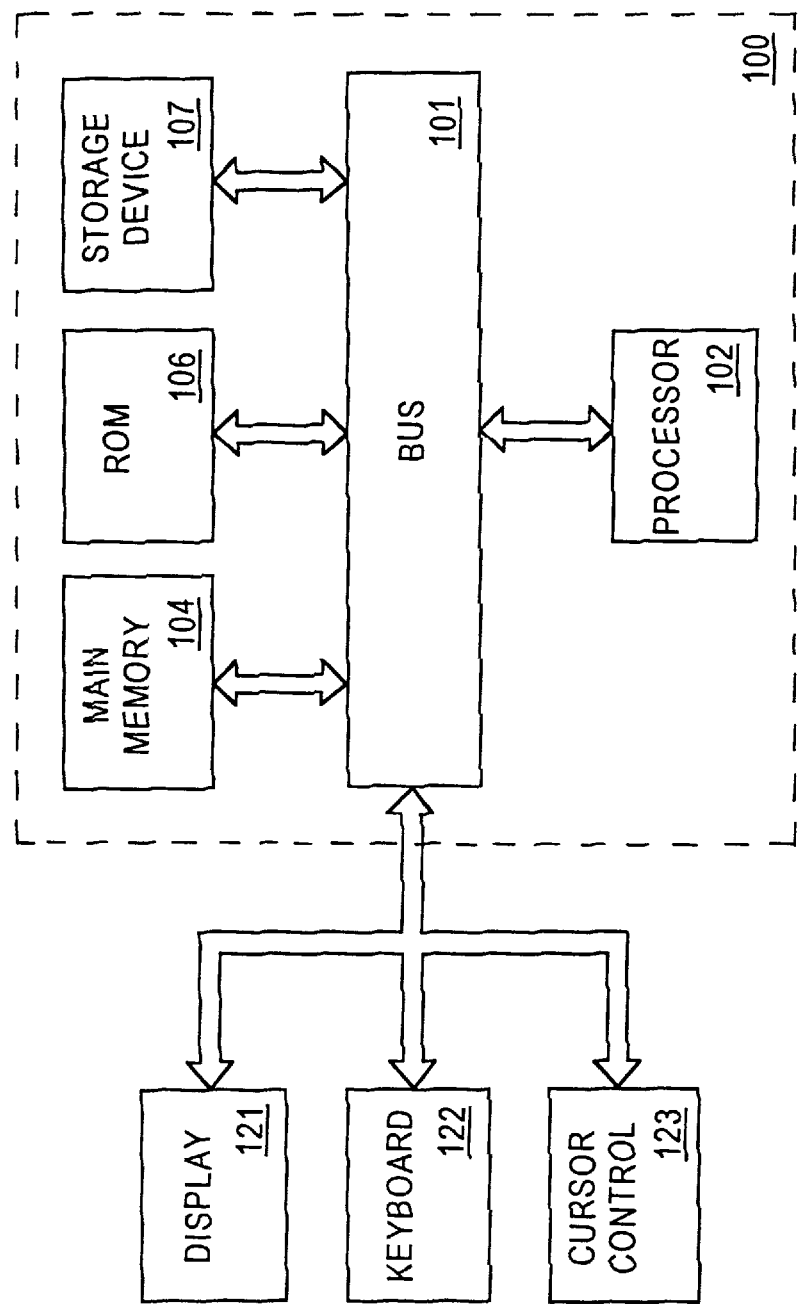
FIG. 1 is a high-block diagram of a computer system.
Figure 2:
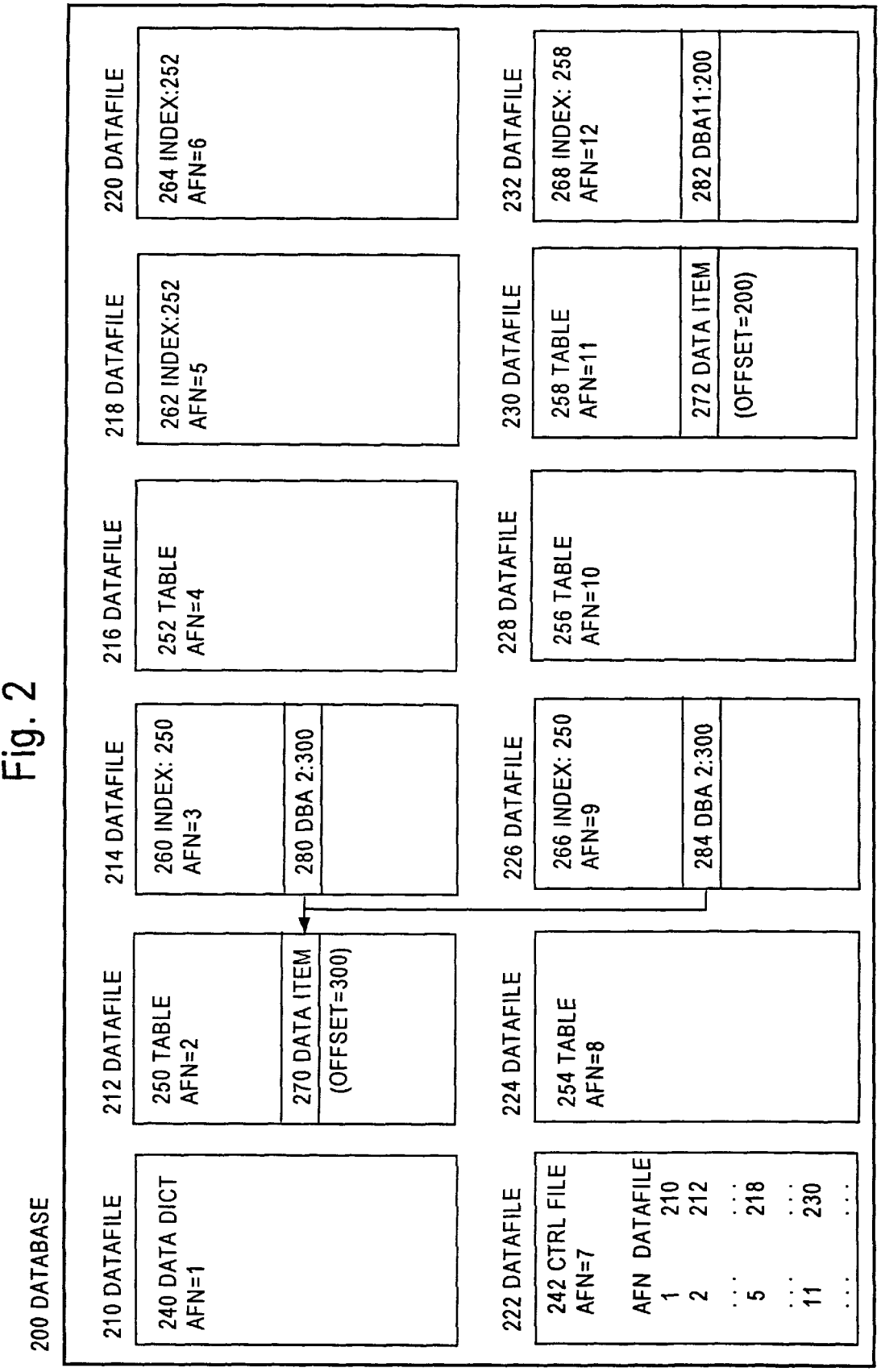
FIG. 2 is a depiction of a conventional source database.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to transfer data between databases. According to one embodiment, transferring data between databases is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

PLUGGABLE TABLESPACES

To facilitate the transfer of a group of datafiles from one database to another, groups of related datafiles are collected into tablespaces. A tablespace is a collection of one or more datafiles. Tablespaces function as a unit of object placement, space administration, and point-in-time recovery. Every datafile within a database belongs to exactly one tablespace, and whenever a new datafile is added to a database, it is always added to a specific tablespace.

Figure 5B:
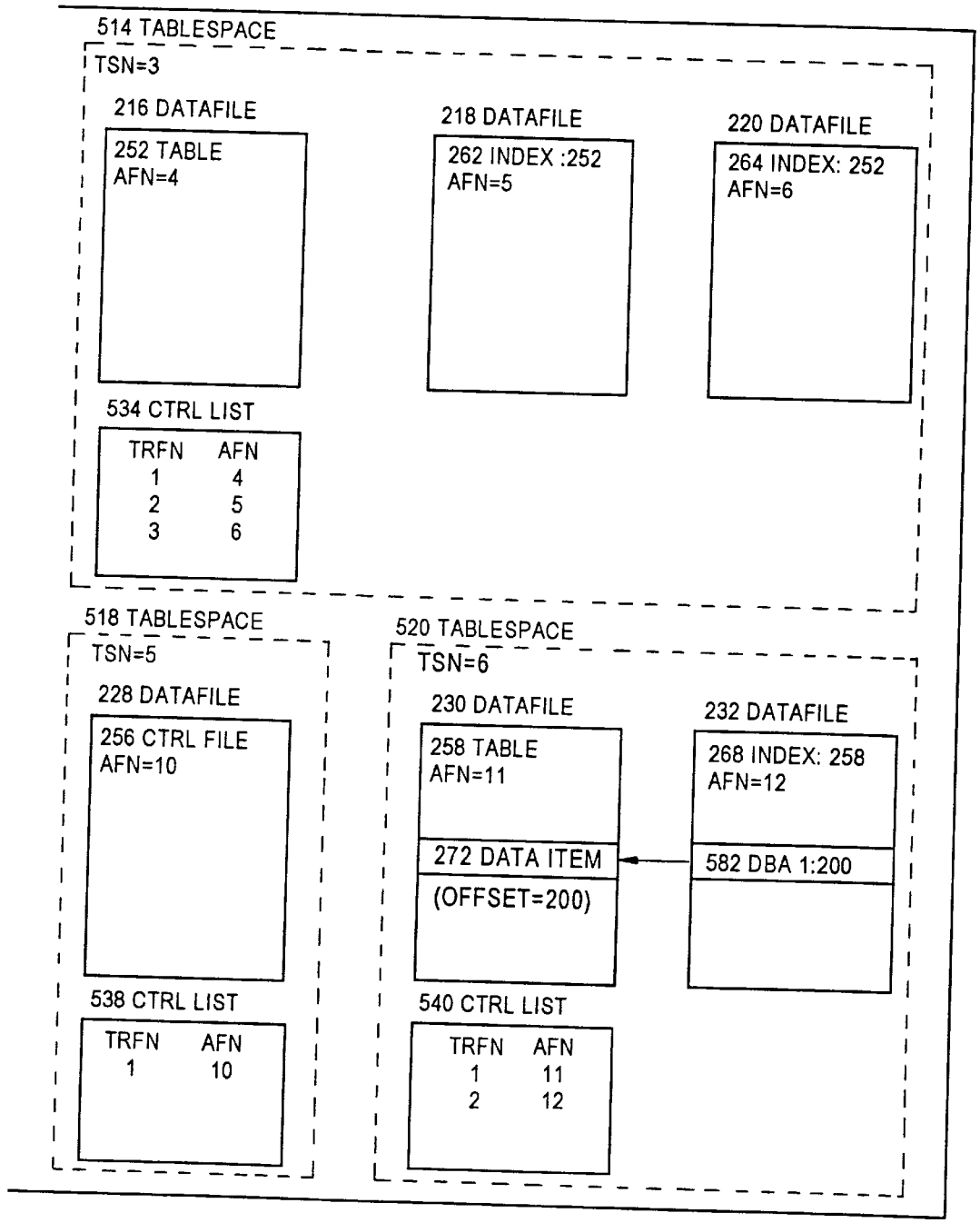

For example, database 200 can be partitioned into six tablespaces as shown in database 500 in FIG. 5. Database 500 comprises six tablespaces, 510 to 520. Datafiles 212 and 214 belong to tablespace 512, and datafiles 216, 218, and 220 belong to tablespace 514. System tablespace 510 comprises data dictionary 240 and control file 242.

According to an embodiment of the invention, transferring data between two databases has two phases. In the first phase, a user "unplugs" a set of tablespaces, containing the desired data, from a source database. Unplugging a set of tablespaces is started by issuing an "unplug" command to a database system, which performs in response the steps shown in FIG. 9(a). At step 900, the database system gets a specification of the tablespaces to be transferred, called the "pluggable set." Step 910 receives the name of an export/import file from the user. For example, a user desiring to transfer the data in table 250 and index 260 from database 500 specifies tables 512 in the unplugging operation. With the pluggable set and the name of the export/import file, the source database produces a set of files (steps 904 and 906) that the user may then copy to a place accessible to the target database.

According to one embodiment of the invention, the unplug operation in step 906 removes the set of tablespaces from the source database; however, another embodiment of the invention leaves the set of tablespaces unchanged in the source database. A preferred embodiment of the invention enables both operations. In this situation, the former operation is termed "unplugging" a set of tablespaces, and the latter operation, "copying" a set of tablespaces.

Given a set of unplugged or copied tablespaces, the user may then plug the set of tablespaces into a target database by issuing a plug-in command with the name of export/import file. The metadata is reconstructed from the pluggable set and the plugged-in tablespaces become new tablespaces in the target database.

Figure 10A:
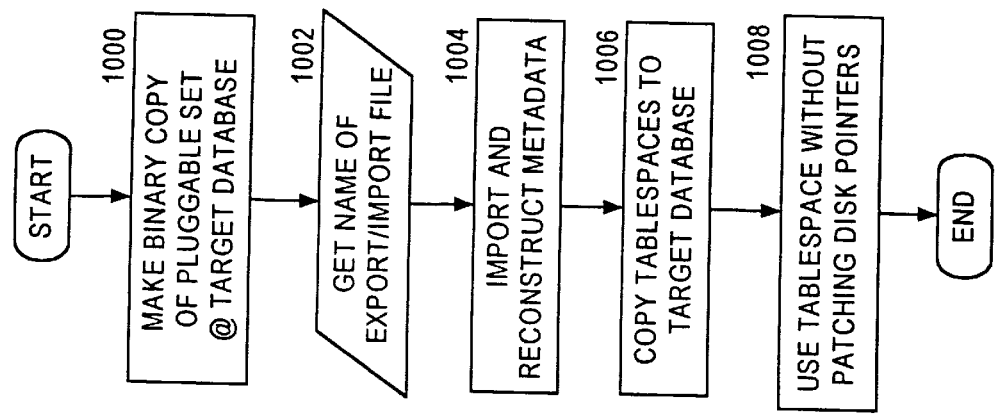
FIGS. 10(a), 10(b), and 10(c) are flowcharts illustrating the operation of plugging a set of tablespaces into a database according to embodiments of the present invention.
Figure 10B:
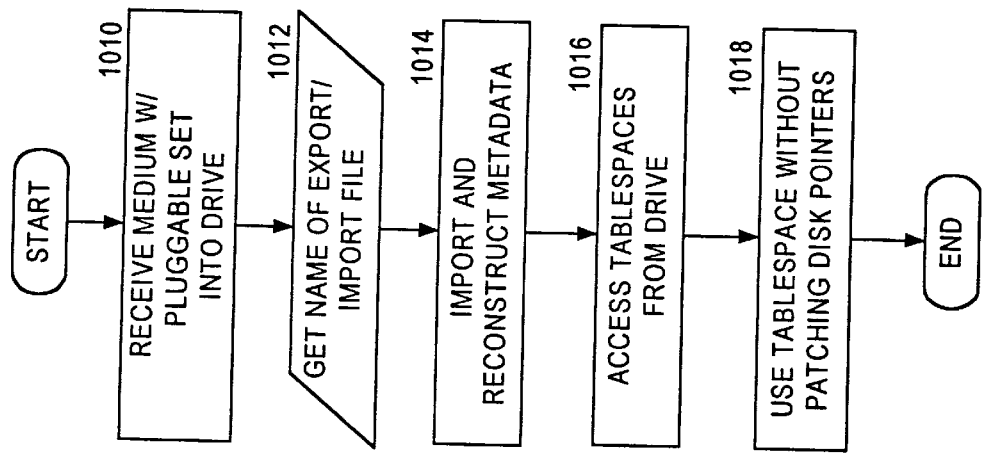
Figure 10C:
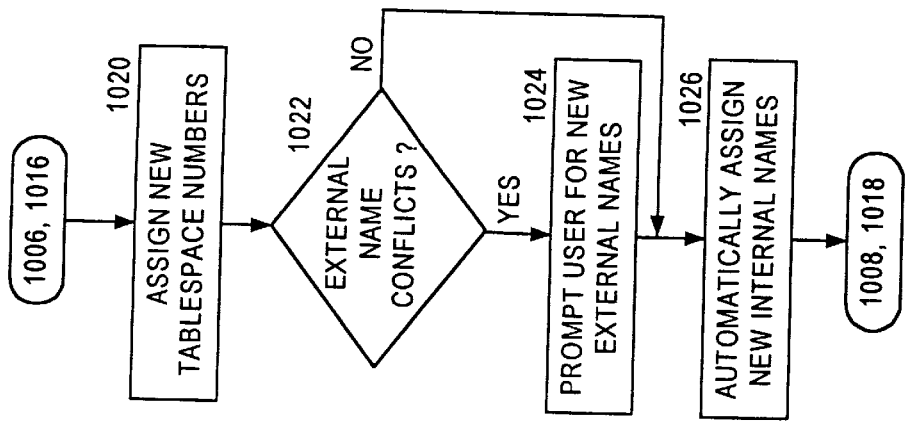

According to one embodiment of the invention, the target database performs the steps illustrated in FIG. 10(*a*). If the pluggable set is located at another site, the target computer system creates a local copy of the file (step 1000), perhaps in a temporary working directory. For example, the target computer system may receive a network transfer of a pluggable set or download the pluggable set from a World Wide Web site.

After the pluggable set is made available to the target system, the name of the export/import file is obtained from a user (step 1002) and the exported metadata in the export/import file is imported and reconstructed (step 1004). At step 1006, the individual tablespaces in the pluggable set are copied so that the tablespaces may used without patching disk pointers (step 1008).

According to another embodiment, the target database accesses the set of tablespaces without copying the tablespaces. In step 1010, the target system received the pluggable on a computer-readable medium in a drive. After prompting for the name of the export/import file (step 1012) and importing the metadata (step 1014), the target system accesses the tablespaces in the pluggable set directly (step 1016), without patching the disk pointers (step 1018).

In a preferred embodiment, both approaches are permitted according to the presence or absence of a "read-only" option. If the read-only option is not specified, then the tablespaces are copied in; on the other hand, if the read-only option is specified, then the tablespaces are used in the drive directly. The read-only option is useful with plugging in tablespaces published on a CD-ROM, because the target database will use the tablespaces by reading the CD-ROM drive without copying the tablespaces into the target database.

The two difficulties in the prior art due to the internal structure of databases are handled by using tablespace-relative disk pointers to avoid disk pointer patching and by exporting/importing only the metadata associated with the transferred set of tablespaces.

TABLESPACE-RELATIVE DISK POINTERS

When a tablespace is created within a database, it is assigned a tablespace number (TSN), which is unique for that database. Each tablespace contains a control list of datafiles, containing a tablespace-relative file number (TRFN) and the corresponding datafile. Thus in FIG. 5, tablespaces 510 to 520 each include control lists 530 to 540. In particular, tablespace 512 includes control list 532, which has entries indicating that a datafile having TRFN of 1 corresponds to the datafile having an AFN of 2. Likewise, a datafile with a TRFN of 2 corresponds to the datafile with an AFN of 3.

A TRFN is unique among the datafiles of a given tablespace, but need not be unique among all the datafiles of a database. In the example of FIG. 5, tablespace 512 has a TSN of 2 and control list 532. Datafile 212 of tablespace 512 has a TRFN of 1 according to control list 532, yet datafile 230 in tablespace 520 also has a TRFN of 1 according to control list 540. Thus, both datafile 512 and datafile 230 have the same TRFN, but they are distinct datafiles. However, the TSNs are different: tablespace 520 has a TSN of 6, and tablespace 512 has a TSN of 2.

Any datafile can be identified by a TRFN in conjunction with a TSN of the tablespace containing a control list with an entry for that TRFN, using the following procedure. Given a TSN and a TRFN, the control list of the tablespace corresponding to the TSN is inspected. The control list entry with the TRFN is fetched, yielding the AFN for the datafile. With the AFN, the operating system information describing how to open the datafile is fetched from the control file, and datafile is opened, if necessary. In the example of FIG. 5, given a TSN of 4 and a TRFN of 1, control list 536 is inspected because it belongs to tablespace 516 having the TSN of 4. From control list 536 the entry for a TRFN of 1 is fetched, yielding an AFN of 8. Looking up the entry for an AFN of 8 in control file 242, datafile 224 is identified. Thus, a TSN:TRFN pair uniquely identifies a particular datafile.

Since a single AFN may be derived from a pair numbers consisting of a TSN and a TRFN, this pair of numbers can replace the AFN in data block address. A tablespace-relative DBA, therefore, is a data block address which uses a TSN, a TRFN, and a file offset to specify the location of a data block. The TSN and TRFN are used to find the proper AFN. The datafile identified by the AFN is opened, and the data block is fetched from the file offset. Looking up the proper AFN from a TSN:TRFN pair may be done by inspecting each control list individually, but in a preferred embodiment all the TSN:TRFN:AFN triples of the database are cached in an open hash table kept in main memory, allowing rapid look up. Any other data structure that can store triples, such as an array, linked list, or tree, may used as well.

The tablespace number for a disk pointer can be derived from the operating context in which the disk pointer is used. Specifically, every disk pointer is associated with a unique tablespace, because each disk pointer is associated with a specific purpose according to metadata in the data dictionary. For example, disk pointers found in an index are associated with the specific table in a specific tablespace upon which the index was built. In the example, disk pointer 580 is found in index 260 built on table 250. Table 250 resides in tablespace 512 with a TSN of 2. Therefore, disk pointer 580 is associated with tablespace 512 and a TSN of 2 can be derived for that disk pointer. Similarly, disk pointer 584 is found in index 266 also built on table 250. Accordingly, disk pointer 584 has a derivable TSN of 2.

When a disk pointer is read from a datafile, the database system can obtain a TSN for the disk from the operating context. Therefore, the TSN of a tablespace-space DBA need not be stored in a disk pointer embedded in a datafile, allowing the portion of a disk pointer allocated for the AFN to indicate the TRFN instead. Such a disk pointer is a "tablespace-relative disk pointers." Disk pointers not embedded within a datafile, such as those disk pointers found in recovery logs, are stored with the proper TSN. However, recovery logs are not transferred from database to database and do not therefore pertain transferring data between databases.

Figure 8:
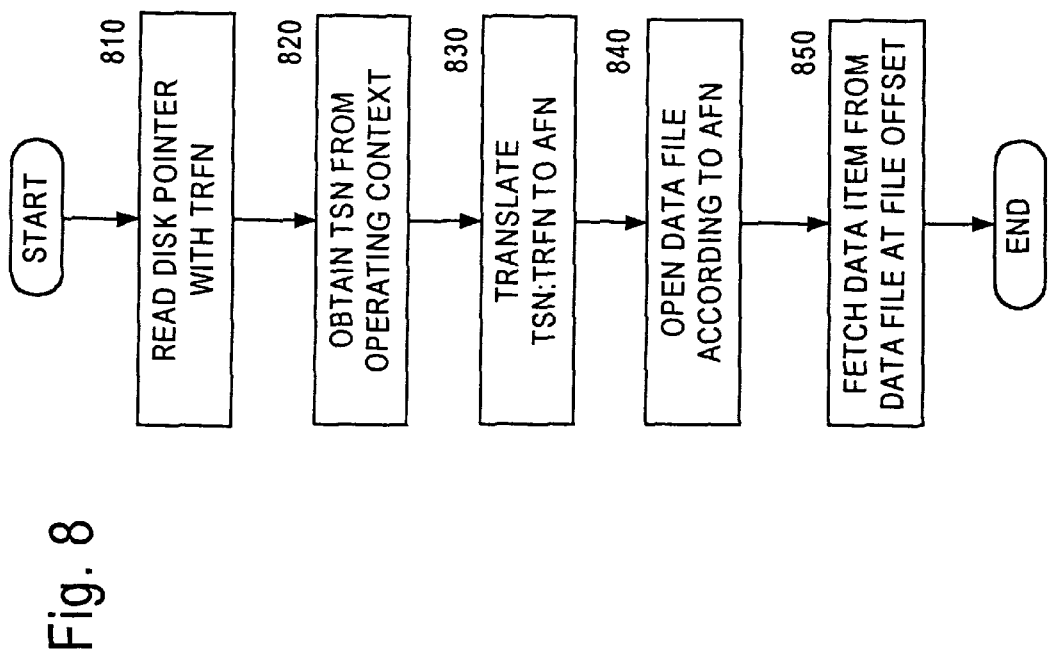
FIG. 8 is a flowchart illustrating how a data item pointed to by a tablespace-relative pointer is fetched.

When disk pointers are stored in a datafile in tablespace-relative format, the method for accessing the data block pointed by a tablespace-relative disk pointer is shown in FIG. 8. In step 810, the disk pointer containing a TRFN and a file offset is read from a datafile. In the next step 820, a TSN is obtained from an operating context. For a disk pointer read from an index, the TSN is the TSN of the tablespace in which the base table for the index is contained. For example the TSN for disk pointer 280, obtained from the operating context, is 1, because index 260 was built on table 250 in tablespace 512 having a TSN of 1.

Proceeding to step 830, the TSN:TRFN pair is translated into an AFN. In the example, the TRFN of 1 is looked up in control list 532 of tablespace 512 with a TSN of 1, and an AFN of 2 is fetched. In a preferred embodiment, an open hash table containing the entries of all the control lists in database 500 is consulted for the AFN. Next, in step 840, the AFN is used to open the corresponding datafile according to the operating system specific information stored for the entry belonging to the AFN. In the example, an AFN of 2 specifies datafile 212. Once the datafile is opened, the data item is fetched from (step 850).

Figure 6:
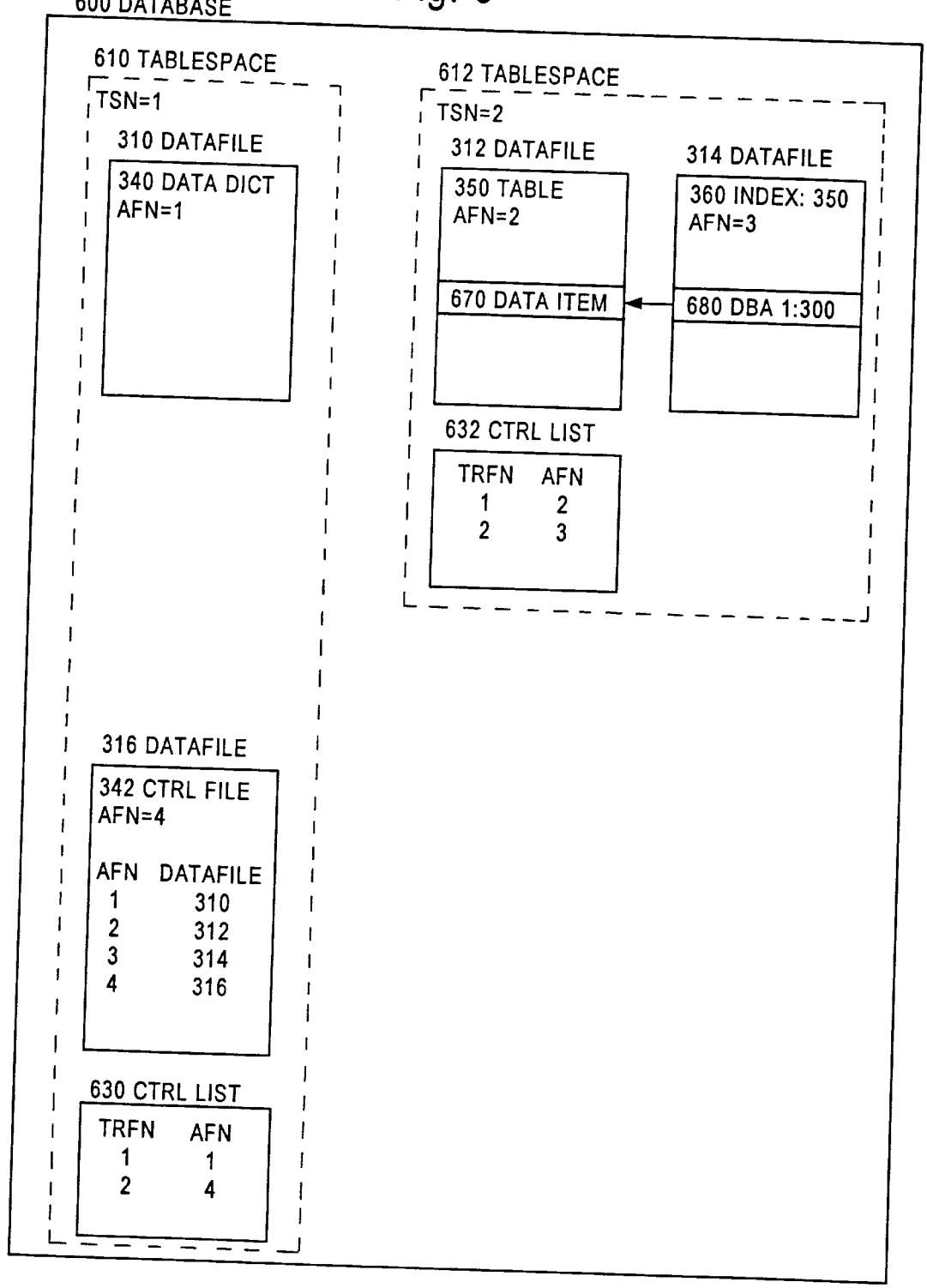
FIG. 6 is a depiction of a destination database according to an embodiment of the present invention.
Figure 7A:
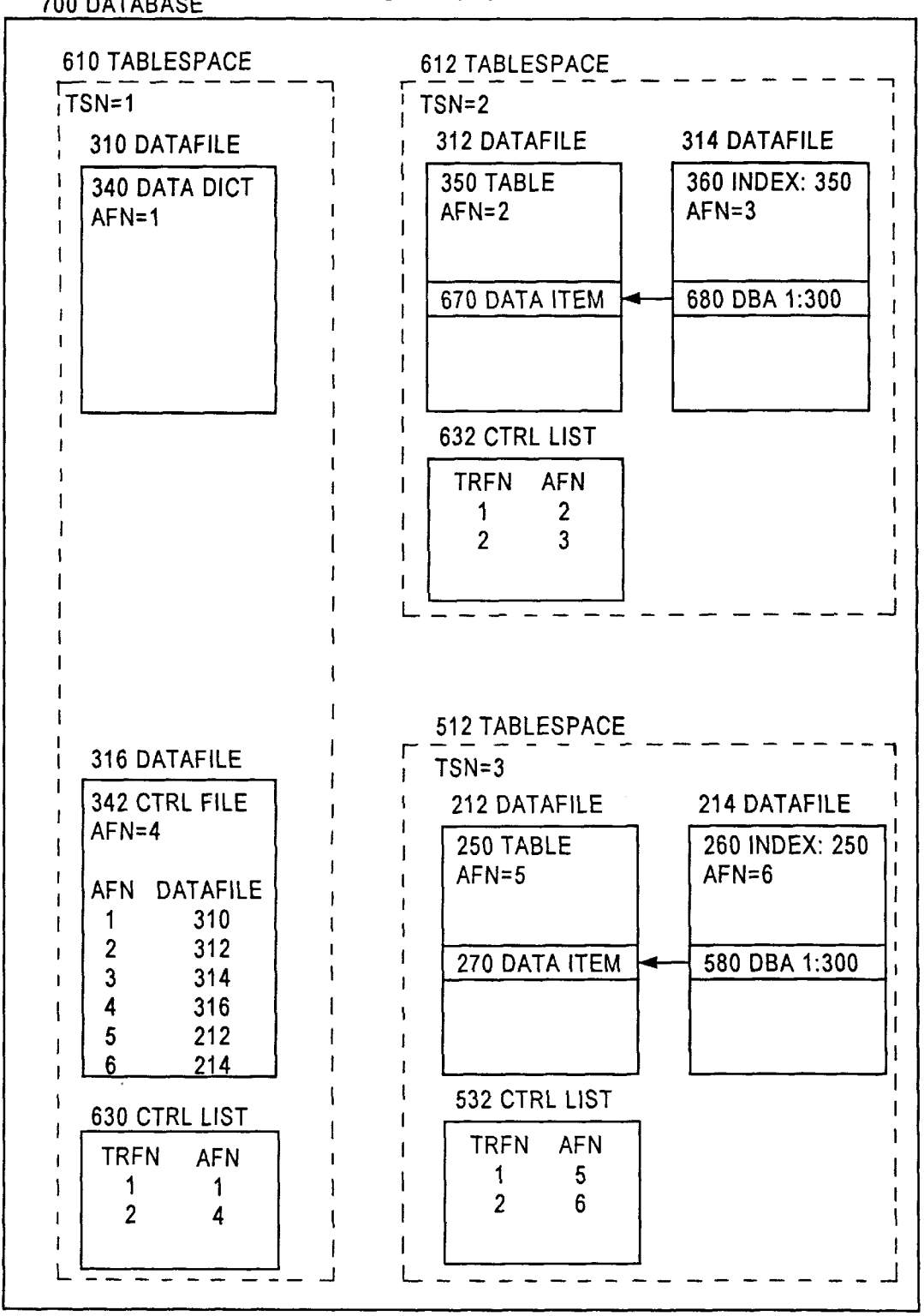
FIGS. 7(a), 7(b) and 7(c) are depictions of plugging in a tablespace according to an embodiment of the invention.

Tablespace-relative disk pointers allow datafile disk pointers to be copied without having to be patched. FIG. 6 shows a destination database 600 with two tablespaces, 610 and 612. Tablespace 612 comprises two datafiles, 312 and 314, and control list 632. Datafile 314 is an index, index 360, built on table 350, and contains tablespace-relative disk pointer 680 with a tablespace-relative DBA of 1:300, pointing to data item 670 in table 350. Copying tablespace 512 of database 500 yields database 700 in FIG. 7(a). Disk pointer 580 maintains the same value, 1:300, but still points to data item 270, even in database 700. During the plugging in process tablespace 512 is copied or accessed without patching any of its disk pointers in datafile 212 or 214. The administrative information in the control list 532 indicating the mapping between the TRFNs for tablespace 512 is reconstituted as described below. Non-dangling disk pointer 580 has the identical value in database 700 as in database 500. However, tablespace-relative disk pointer 580 still points to data item 270, because the TSN for disk pointer 680 is 1, and control list 532 maintains that a TRFN of 1 indicates datafile 212. Thus, tablespace-relative disk pointers avoid the aliasing problem associated with the absolute disk pointer technology.

Figure 7B:
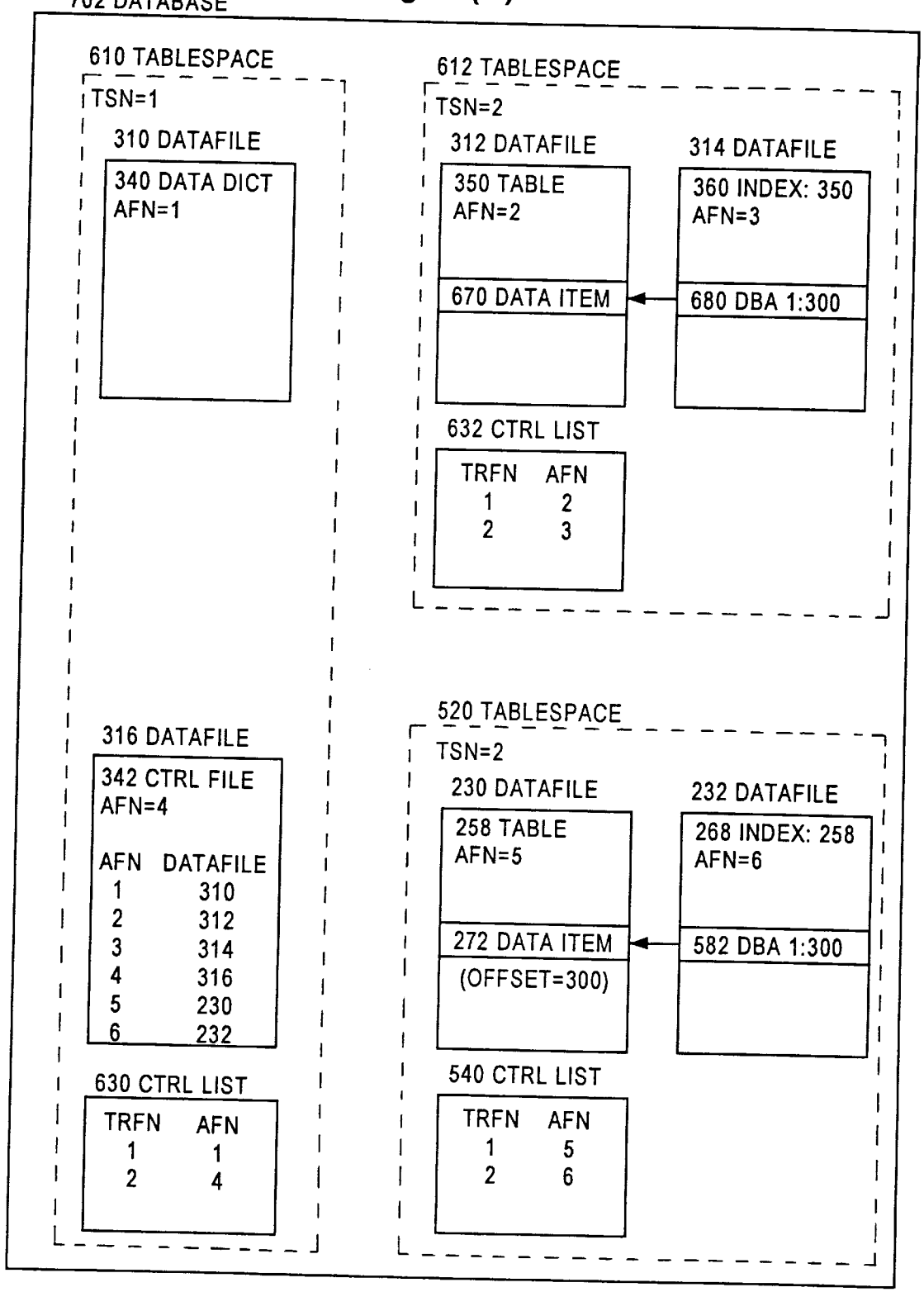

Tablespace-relative disk pointers also remain valid after being transferred to a target database. FIG. 7(b) illustrates the result, database 702, of plugging tablespace 520 of database 500 into database 600. Tablespace-relative disk pointer 582 contains the same value of source database 500, 1:300. However, disk pointer 582 continues to point to data item 272, because the tablespace relative file number portion of the disk pointer is still valid.

Therefore, patching tablespace-relative disk pointers is avoided because only the corresponding control list is modified. All disk pointers are stored in tablespace-relative format, so that no disk pointer will have to be patched in either the unplugging or plugging in process.

INTEGRATING METADATA

Metadata concerning a set of tablespaces contains information about the objects in the tablespace. These objects include, for example, tables, clusters, indexes, partitioned tables, and referential integrity constraints. Metadata also includes information about space allocation in those tablespaces.

Some objects are related to associated with other objects. For example, indexes are typically associated with tables. An index that is built on a table contains database pointers to that table. As another example, referential integrity constraints can associate with several tables. In addition, all partitions of a table are related to each other. The database system typically keeps track of these relationships in a data dictionary. Therefore, the database system is able to determine whether a set of tablespaces, the "pluggable set," contains pointers outside the pluggable set.

According to an embodiment of the invention, dangling pointers are avoided by ensuring that the pluggable set is self-contained when the pluggable set is created. With reference to FIG. 9(b), during the metadata export process, the pluggable set is checked whether it is self-contained (step 910). If the pluggable set is not self-contained, then all objects that may contain pointers to objects outside the pluggable set are dropped from the tablespace (step 912). After the pluggable set was made self-consistent, then metadata for the remaining objects in the pluggable set is exported (step 914).

Figure 7C:
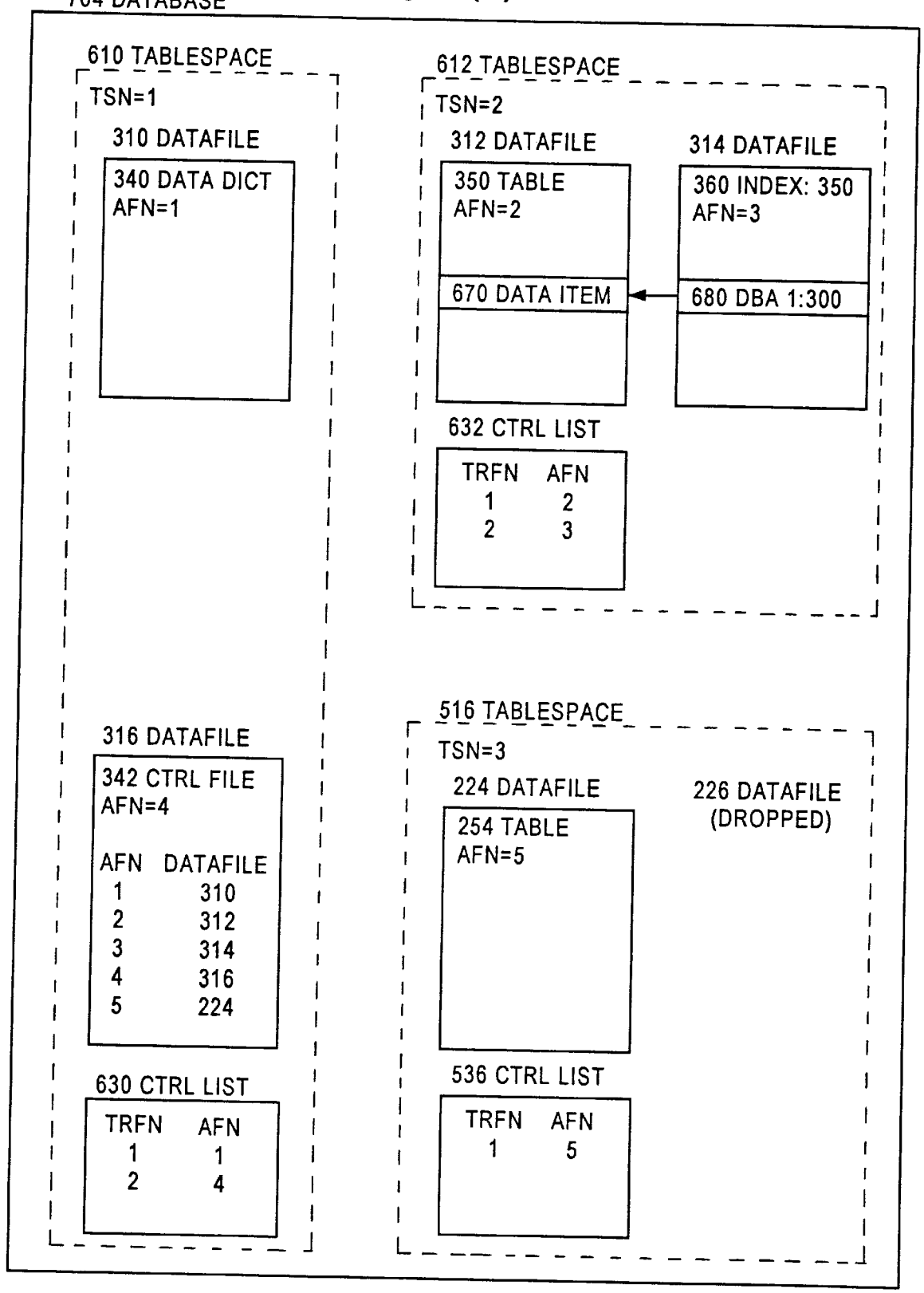

For example, when tablespace 516 as the only tablespace in a pluggable set is unplugged from database 500 of FIG. 5, the database system inspects the objects in the tablespace, table 254 and index 266. Index 266 is built on table 250, which is found in tablespace 512, which is not in the pluggable set. Therefore, the database will drop index 266 from unplugged tablespace 516. Accordingly, when the pluggable set is plugged into database 600 the result is shown in FIG. 7(c), where only table 254 is transferred to database 704.

On the other hand, when a pluggable set is copied instead of unplugged, the database system prompts the user when the pluggable set is not self-contained. Referring to FIG. 9(c), the database system determines whether the pluggable set is self-contained (step 920). If the pluggable set is not self-contained, then the database system signals errors to the user if there are objects that may contain dangling pointers (step 922). This step allow the user to either drop those objects or change the pluggable set in order to make the pluggable set self-contained. Once the pluggable set is determined to be self-contained, then metadata is exported (step 924).

In the example, if tablespace 516 is being copies, the database system determines that index 266 may contain pointers outside the pluggable set, because it is built on a table outside of the pluggable set. When the user is prompted, the user may allow index 266 to be dropped from the pluggable set or expand the pluggable set to include tablespace 512, which contains the table, table 250, upon which index 266 was built. In either case, the result is a self-contained pluggable set.

When the pluggable set is created in plug-in format, all the metadata information in the data dictionary about all objects in the pluggable set is exported in DDL format into an export/import file. This information includes data about tables, indexes, referential integrity constraints, and space allocation. For an object in the pluggable set, such as a table, part of the exported information includes a tablespace-relative pointer to the location of the object. The actual values of tablespace-relative pointers remain valid, but new tablespace numbers are assigned for the tablespaces in the pluggable set. The active control list information about tablespace numbering is kept in the data dictionary.

To plug the pluggable set in a target database, the export/import file is made accessible to the target database, for example, by copying the file to the target database system; see step 1000 of FIG. 10(a). In another embodiment, the export/import file is made accessible by loading a CD-ROM with the pluggable set into a CD-ROM drive accessible to the computer system running the target database; see step 1010 of FIG. 10(*b*).

The metadata for the pluggable set is reconstructed using the DLL statements in the export/import file and inserted into the target database's data dictionary (steps 1004 and 1014), the steps of which are illustrated in FIG. 10(*c*). In step 1020, the tablespaces in the pluggable set are assigned new tablespace numbers.

One issue with importing metadata is name conflicts. There are two kinds of name conflicts, external and internal. An external name is the name, usually in the form of a string, by which a user refers to a particular object. For example, a table may have an external name of "sales," and an external name conflict occurs when both the pluggable set and the target database contain a table called "sales." An internal name is typically used by a database system to keep track of the identity of objects. Some databases call the internal name of an object an object number. When a pluggable set is plugged in, some of the external and internal name may already be in use in the target database.

External name conflicts are resolved with help from the user. When metadata is being reconstructed for a pluggable set, the external name of an object, present in the metadata, is checked to determine whether the name is already being used in the database (step 1022). If that name is in use, then the plug-in procedure signals an error, giving the user a chance to change the offending name in the target database and re-execute the plug-in procedure (step 1024).

A special case occurs when a data warehouse is periodically refreshed with tablespaces from an OLTP database. In this case, the user should drop the tablespaces in the data warehouse before plugging a more recent version of the pluggable set from the OLTP database into the data warehouse. This procedure avoids a potentially large number of external name conflicts.

Internal name conflicts are resolved automatically during the plug-in process (step 1026). While the metadata is being imported into a target database, new objects are simply assigned a new internal name and propagated to other objects in the pluggable set that refer to them.

CD-ROM PUBLISHING

A particular aspect of pluggable tablespaces allows for CD-ROM publishing. A set of tablespaces containing the data to be published is impressed onto a CD-ROM in plug-in format. The CD-ROM is distributed to the target database by conventional means (e.g., by mail, overnight delivery, file transfer protocol). At the target site, the CD-ROM pluggable set is plugged into a target database, by loading the CD-ROM into a CD-ROM drive of the target computer system. After the set of tablespaces is thus available, the metadata contained on the CD-ROM is imported into the target database. Since the user data of the CD-ROM pluggable set is already in native format, the tablespaces in the pluggable set need not be converted or even copied and may remain in the CD-ROM driver, conserving disk space of the target site.

Plugging in a set of tablespaces without changing the datafiles in the tablespaces is possible because the tablespace-relative pointers in the datafiles need not be patched. Furthermore, with a "read-only" option, the database can remember that the information in the pluggable set is read-only by storing such an indication in the data dictionary and control files.

Other aspects of the invention allows for publishing a pluggable set on to other transportable media. For example, one embodiment of the invention publishes the pluggable set on a magnetic disk, such as a floppy disk. Another embodiment publishes the pluggable set on a magnetic table, such as a magnetic tape cartridge or magnetic tape reel.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for unplugging a set of tablespaces, associated with metadata and having a plurality of disk pointers, from a source database to a memory, comprising the computer-implemented steps of:

storing said plurality of disk pointers in tablespace-relative format;

saving said metadata into a metadata file; and making a binary copy of said set of tablespaces and said metadata file to said memory wherein said plurality of disk pointers with said binary copy, when plugged into a target database, is capable of being used for locating associated data items without patching said plurality of disk pointers.

2. The method of claim 1, wherein the step of saving said metadata into a metadata file includes the step of exporting said metadata into the metadata file.

3. The method of claim 2, wherein the step of exporting said metadata into the metadata file includes the steps of:

determining whether said set of tablespaces is self-contained;

if said set of tablespaces is not self-contained, then dropping objects in said set of tablespace that refer to objects not present in said set of tablespaces.

4. The method of claim 2, wherein the step of exporting said metadata into the metadata file includes the steps of:

determining whether said set of tablespaces is self-contained;

if said set of tablespaces is not self-contained, then outputting a message to a user that said set of tablespaces is not self-contained.

5. The method of claim 4, further comprising the step of outputting a second message identifying which tablespaces of said set of tablespace causes said set of tablespaces to be not self-contained.

6. The method of claim 1, further comprising the step of locating a data item within a datafile contained in said tablespace by performing the steps of:

reading a tablespace-relative disk pointer associated with said data item;

determining an identity of said tablespace; and locating said data item based on said tablespace-relative disk pointer and said identity of said tablespace.

7. A method of plugging in a pluggable set of tablespaces having a plurality of disk pointers and saved metadata, into a target database, comprising the computer-implemented steps of:

incorporating said saved metadata into said target database;

copying each tablespace of said pluggable set of tablespaces into said target database; and locating a data item associated with any one of said plurality of disk pointers without patching any disk pointer of said plurality of disk pointers.

8. The method of claim 7, wherein the step of incorporating said saved metadata into said target database, includes the step of importing said saved metadata into said target database.

9. The method of claim 7, further comprising the step of assigning a new tablespace number to each tablespace in said pluggable set of tablespaces, wherein each new tablespace number is unique within said target database and said pluggable set of tablespaces.

10. The method of claim 7, further comprising the steps of:

determining whether an external name of an object contained in said pluggable set of tablespaces exists in said target database;

if said external name of said object contained in said pluggable set of tablespaces exists in said target database, then prompting the user to rename an object within said target database having said external name.

11. The method of claim 7, further comprising the step of automatically assigning a new internal name to an object within said pluggable set of tablespaces, wherein said internal name is unique within said target database and said pluggable set of tablespaces.

12. A method of transferring a tablespace, associated with metadata and having a plurality of disk pointers, from a first database to a second database, comprising the steps of:

storing said plurality of disk pointers in tablespace-relative format at first database;

saving said metadata into a metadata file;

making a binary copy of said tablespace and said metadata file;

causing said binary copy to be available to said second database;

incorporating said metadata from said binary copy into said second database; and locating a data item associated with any one of said plurality of disk pointers without patching said plurality of disk pointers.

13. The method of claim 12, wherein the step of saving said metadata into a metadata file includes the step of exporting said metadata into the metadata file.

14. The method of claim 13, wherein the step of exporting said metadata into the metadata file includes the steps of:

determining whether said set of tablespaces is self-contained;

if said set of tablespaces is not self-contained, then dropping objects in said set of tablespace that refer to objects not present in said set of tablespaces.

15. The method of claim 13, wherein the step of exporting said metadata into the metadata file includes the steps of:

determining whether said set of tablespaces is self-contained;

if said set of tablespaces is not self-contained, then outputting a message to a user that said set of tablespaces is not self-contained.

16. The method of claim 15, further comprising the step of outputting a second message identifying which tablespaces of said set of tablespace causes said set of tablespaces to be not self-contained.

17. The method of claim 12, wherein the step of incorporating said saved metadata into said second database, includes the step of importing said saved metadata into said second database.

18. The method of claim 12, further comprising the step of assigning a new tablespace number to each tablespace in said pluggable set of tablespaces, wherein each new tablespace number is unique within said second database and said pluggable set of tablespaces.

19. The method of claim 12, further comprising the steps of:

determining whether an external name of an object contained in said pluggable set of tablespaces exists in said second database;

if said external name of said object contained in said pluggable set of tablespaces exists in said second database, then prompting the user to rename an object within said second database having said external name.

20. The method of claim 12, further comprising the step of automatically assigning a new internal name to an object within said pluggable set of tablespaces, wherein said internal name is unique within said target database and said pluggable set of tablespaces.

21. A computer readable medium, having stored thereon sequences of instructions for unplugging a tablespace, associated with metadata and having a plurality of disk pointers, from a source database to a memory, said sequence of instructions including instructions for performing the steps of:

storing said plurality of disk pointers in tablespace-relative format;

saving said metadata into a metadata file; and making a binary copy of said tablespace and said metadata file to said memory wherein said plurality of disk pointers with said binary copy, when plugged into a target database, is capable of being used for locating associated data items without patching said plurality of disk pointers.

22. The computer readable medium of claim 21, further including instructions for performing the step of exporting said metadata into a metadata datafile contained in said tablespace.

23. A computer readable medium, having stored thereon sequences of instructions for plugging in a tablespace, containing saved metadata and a plurality of disk pointers, into a target database, said sequence of instructions including instructions for performing the steps of:

making said unplugged tablespace stored in said memory available to said target database;

incorporating said saved metadata into said target database; and locating a data item associated with any one of said plurality of disk pointers without patching said plurality of disk pointers.

24. The computer readable medium of claim 23, further including instructions for performing the step of importing said metadata from a metadata datafile contained in said tablespace.

* * * * *